United States Patent [19]

Goldsmith

[11] Patent Number: 5,117,855
[45] Date of Patent: Jun. 2, 1992

[54] AUTOMATIC WATER CONTROL APPARATUS

[76] Inventor: Aaron Goldsmith, 23918 Park Granada, Calabasas, Calif. 91302

[21] Appl. No.: 645,660

[22] Filed: Jan. 25, 1991

Related U.S. Application Data

[63] Continuation-in-part of Ser. No. 500,026, Mar. 27, 1990, Pat. No. 4,987,915.

[51] Int. Cl.⁵ .............................................. A01G 25/00
[52] U.S. Cl. .................... 137/78.3; 137/486; 137/613; 137/907; 239/63
[58] Field of Search ............... 137/486, 500, 502, 78.3, 137/907, 613; 239/63

[56] References Cited

U.S. PATENT DOCUMENTS

| | | | |
|---|---|---|---|
| 1,673,041 | 6/1928 | Connet et al. | 137/502 |
| 1,725,374 | 8/1929 | Rush | 137/486 |
| 2,093,842 | 9/1937 | MacLean et al. | 137/502 |
| 2,164,153 | 6/1939 | Friedrich | 137/599.1 |
| 2,829,664 | 4/1958 | Mountford | 137/502 |
| 2,863,698 | 12/1958 | Richards | 239/63 |
| 3,981,446 | 9/1976 | Hunter | 239/63 |
| 3,991,939 | 11/1976 | Maclay | 137/78.1 |
| 4,055,200 | 10/1977 | Lohoff | 239/63 |
| 4,256,133 | 3/1981 | Coward et al. | 137/78.3 |
| 4,506,594 | 3/1985 | Rowland et al. | 137/486 |

Primary Examiner—A. Michael Chambers
Attorney, Agent, or Firm—Lewis Anten

[57] ABSTRACT

An automatic water control system with a venturi has a bypass conduit so that the venturi does not act to limit the flow of water to demands made downstream of the water control system. Further, the automatic water control means has a light sensitive control to allow water flow only during day or night by controlling the transmission of the vacuum pulled by the venturi to a porous moisture sensor.

14 Claims, 6 Drawing Sheets

AUTOMATIC WATER CONTROL APPARATUS

CROSS REFERENCES TO RELATED APPLICATIONS

This is a continuation-in-part of application Ser. No. 07/500,026, as amended, filed on Mar. 27, 1990, to be issued on Jan. 29, 1991 as U.S. Pat. No. 4,987,915 entitled AUTOMATIC WATER CONTROL APPARATUS by the same inventor.

BACKGROUND

A. Field of the Invention

This invention relates to improvements for automatic water control apparatus and more particularly to improvements related to relieving bottlenecks and allowing more water flow by circumventing a venturi device or similar bottleneck and also to controlling the time of day when water is allowed to flow.

B. Description of the Related Art

In the underlying application, an automatic water control device was set forth that controlled water flow according to need as sensed by a sensor. A venturi device created a region of low pressure that was transmitted to a pressure sensitive valve housing that was in turn connected to the sensor. Presence or absence of ambient pressure controlled the flow of water through the valve device. No outside energy source was necessary for switching the apparatus from on to off states, or vice-versa. Energy for the control device was derived from pressurized water flowing both through and past the control device.

The prior art pertinent to the underlying patent of this continuation-in-part is set forth therein and briefly summarized below.

U.S. Pat. No. 4,214,701 issued to Beckman described a swellable member clamped around a water supply hose that cut off the water supply by crimping the hose when the member swelled.

U.S. Pat. No. 3,874,590 issued to Gibson also had a swelling member that closed a switch rather than crimping a hose.

U.S. Pat. No. 2,445,717 described a ceramic element through which water would flow both into and out of. The water supply to the element had to be replenished periodically and the element had to be accessible to the surface.

U.S. Pat. No. 3,747,399 issued to Treirat, a wick created a pressure differential when inserted into a tube, but was sensitive to clogging and unreliable.

U.S. Pat. No. 2,863,698 issued to Richards used capillary action to slowly open a valve by slight pressure application.

U.S. Pat. No. 3,981,446 used a column of water to control a valve, the water column creating small pressure differentials.

U.S. Pat. No. 2,215,132 issued to Parker used a venturi device for liquid distribution and not as a control.

SUMMARY OF THE INVENTION

The current invention may be summarized as follows. In an automatic water control apparatus as described in the underlying invention, certain improvements are made whereby the vacuum-pulling venturi device is in parallel with an alternate water path controlled by a vacuum-responsive butterfly valve. Also, exclusive daytime/nighttime water flow control may be achieved by means of a solar cell/solenoid combination that controls air flow through tubing connected to the ceramic element sensor.

In the underlying invention, the water control apparatus is vacuum actuated by means of water flow past a venturi device. All water flow was channeled past the venturi device. This design created a potential bottleneck that could impede the flow of water past the venturi, preventing adequate water supply for demand downstream of the water control apparatus. The venturi potentially created too much resistance in the water line by creating high back pressure.

To overcome this potential obstacle, an alternate path is provided for water flow that bypasses the venturi without overly reducing the pressure due to the venturi. This alternate means may comprise a pipe or other enclosed means. The bypass is immediately preceded by a butterfly valve that is controlled by the vacuum produced by the venturi. Once the butterfly valve opens, water may flow through both the bypass and the venturi. In this way, the vacuum created by the venturi is somewhat maintained while allowing downstream water flow after the venturi has obtained the necessary vacuum.

Another improvement of the underlying automatic water control apparatus resides in the use of a movable plug that controls the effect of the ceramic element sensor upon the automatic water control apparatus. The movable plug is moved into position by a solenoid that is in turn connected to a solar cell. The solar cell detects the presence and absence of light, and controls the activity of the solenoid in response thereto. The solenoid moves the plug to allow or prevent transmission of the vacuum created by the venturi to the ceramic element sensor. In this way, the position of the plug controls the effect of the ceramic element sensor upon the automatic water control apparatus. A user is able to control the activity of the solenoid so that either daytime or nighttime water control activity may chosen.

OBJECTS OF THE INVENTION

It is an object of this invention to provide an improved automatic water control apparatus.

It is also an object of this invention to provide adequate water supply for demands downstream of the improved automatic water control device.

It is also an object of this invention to provide adequate water supply for demands downstream of the improved automatic water control device responsive to the improved automatic water control device.

It another object of this invention to provide a daytime/nighttime control for the improved automatic water control apparatus that allows the apparatus to operate either during the day or during the night, as chosen by a user.

These and other objects and advantages of the present invention will be apparent from a review of the following specification and accompanying drawings.

DESCRIPTION OF THE PREFERRED EMBODIMENT

The underlying system is described herein before the description of further advancements.

Figure 1:
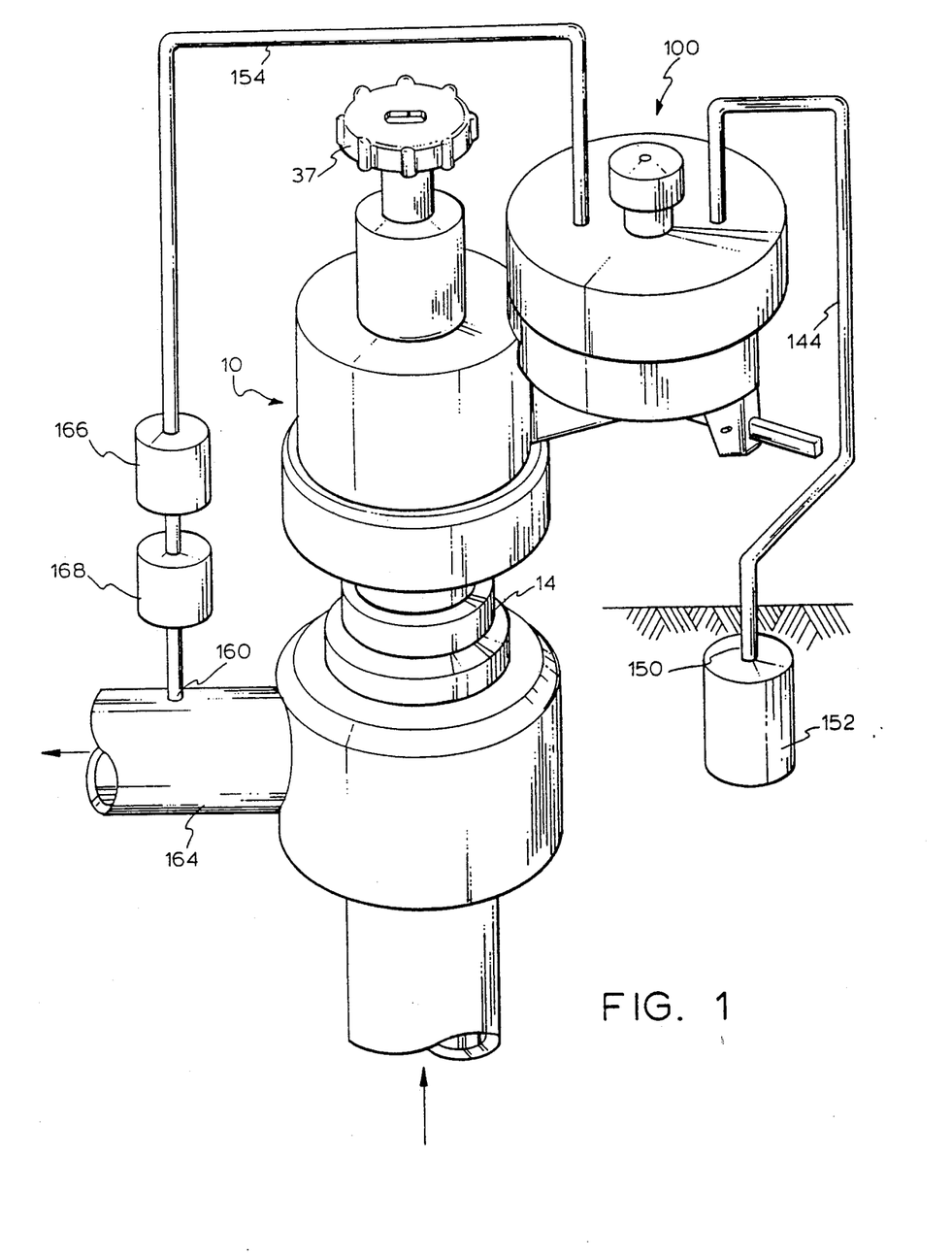
FIG. 1 is a perspective drawing of the exterior of the underlying device.
Figure 2:
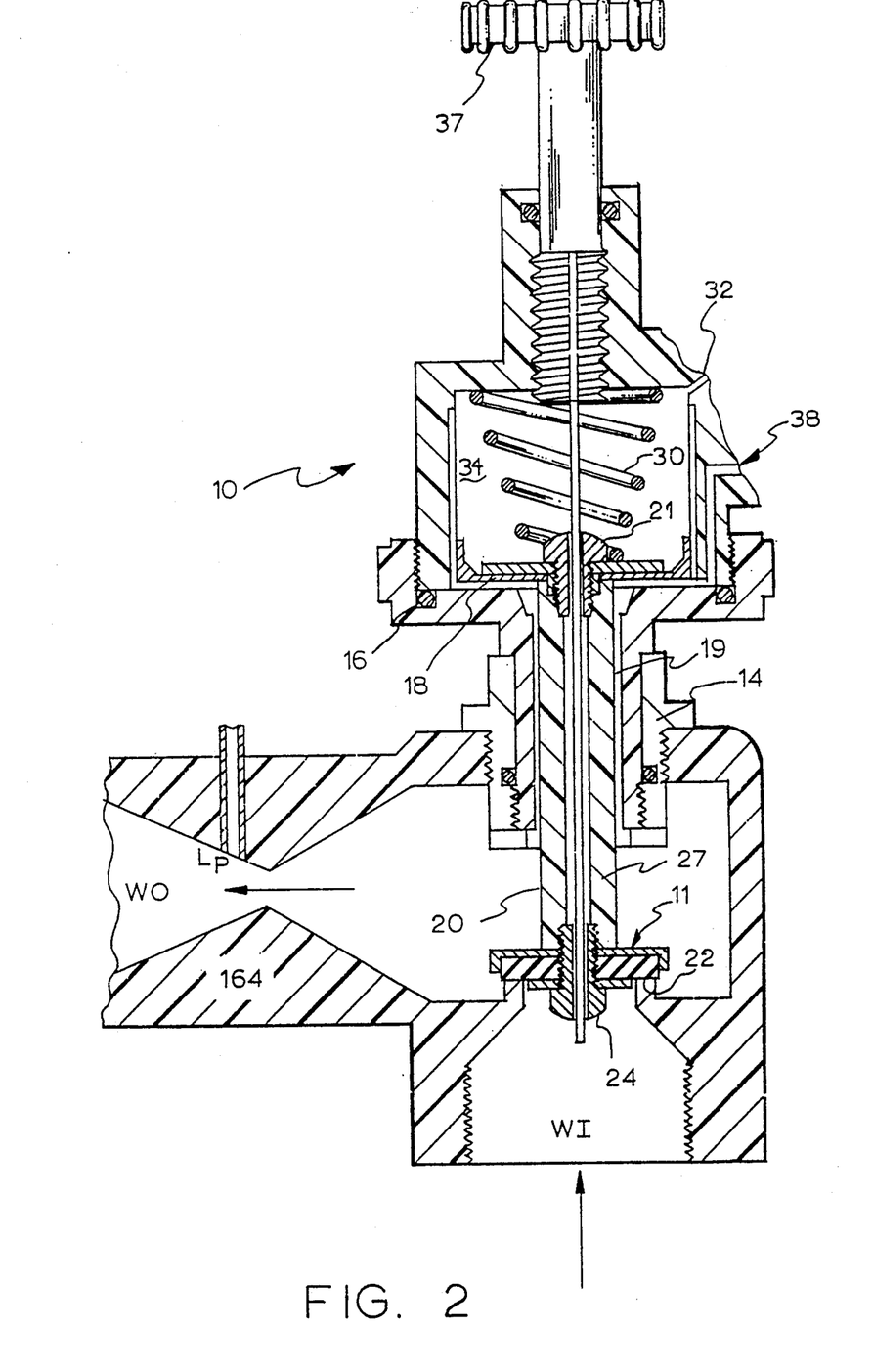
FIG. 2 is a cutaway section view of the central water distribution portion of FIG. 1.

In reference to FIGS. 1 & 2, an exterior view of the underlying invention. A main valve housing 10 is connected to a pressure sensitive valve housing 100. The main valve housing 10 includes a main valve 11, a lower tubular portion 14 which is threaded to the housing and sealed thereto by means of an O-ring 16.

A piston 18 slides within the valve housing 10. A valve stem 20 is attached to the piston 18 by means of a screw 21. The valve stem 20 extends through the bottom thereof.

A usual valve member 22 is mounted to the bottom of the valve stem 20 by means of a screw 24. A bleed port 27 extends longitudinally through the valve stem 20 and through the screws 21 and 24.

A spring 30 within the valve housing biases the piston 18 towards the bottom of the cylindrical chamber 34 defined by the valve housing 10.

The tubular portion 14 is intended to be mounted in a valve housing of the usual anti-siphon type of valve, and the valve member 22 seats against the valve seat in the housing when the piston 18 is displaced to the bottom of the chamber 34 in the chamber 19. The spring 30 acts to bias the valve in a closed position.

Water enters the chamber 34 through the bleed port 27 and establishes a hydraulic pressure against the top of piston 18. Due to the fact that the piston area is greater than the area of the valve member 22, the resulting hydraulic action holds the valve closed.

A pilot port 32 extends at an angle from the upper end of the chamber 34 in the valve housing 10, to the cylindrical pilot valve chamber 36 (FIG. 3) of the pilot valve assembly 115 at the bottom of the pressure sensitive valve housing 100.

Figure 3:
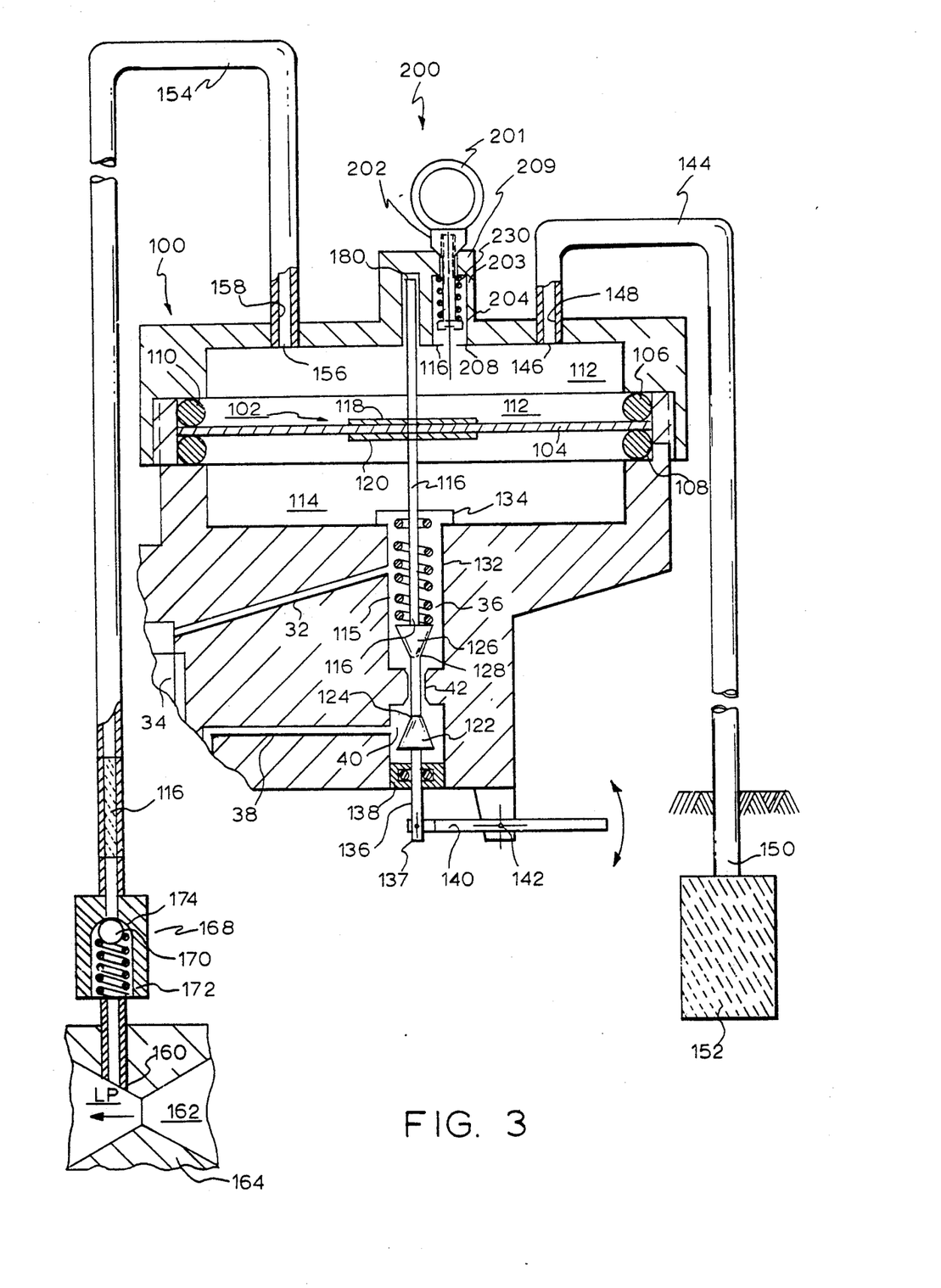
FIG. 3 is a section view of the pressure sensitive housing of FIG. 1.

A further passageway 38 is formed from a second cylindrical pilot valve chamber 40 in the pressure sensitive valve housing 100 to chamber 34 in the main valve housing 10 beneath the piston 18. The second cylindrical pilot valve chamber 40 is connected by a passageway 42 to the first cylindrical pilot valve chamber 36.

A pressure sensitive valve 102 is disposed in valve housing 100. The pressure sensitive valve 102 consists of a diaphragm 104 and O-ring seals 106 and 108 fitted within an annular cavity 110. The diaphragm 104 divides the valve into an upper pressure sensing chamber 112 and a lower chamber 114. A plunger pin 116 passes through the center of the diaphragm and is fixed to the diaphragm 104 by plates 118 and 120 on either side of the diaphragm 104. The plunger pin extends out of the bottom of the valve housing 100 and through the top of the valve housing 100.

One portion of the plunger pin 116 is connected to a lower conical plug 122 having its apex 124 facing the diaphragm 104 and positioned in the second cylindrical pilot valve chamber 40. The other end of the plunger pin 116 is fitted in guide hole 180 to maintain the plunger pin in a vertical orientation and the diaphragm 104 in a proper position. A second conical plug 126 fixed to the plunger pin 116, above the first plug 122, has its apex 128 facing away from the diaphragm 104 and is positioned in first cylindrical pilot valve chamber 36.

The lower plug 122 is fitted in the cylinder chamber 40 and the upper plug 126 is fitted in the cylinder chamber 36 spaced from one another and of such a size so that the upper plug 126 blocks the top opening in the passageway 42 when the plunger pin 116 is lowered. The lower plug 122 blocks the lower opening of the passageway 42 when the plunger pin 116 is raised.

A spring 132 is fitted in the pilot valve chamber 36 pressed against the flat portion of the conical plug 126 on one side and by an airtight insert 134 inserted into the top of cylinder chamber 36. An extension 136 of the plunger pin 116 extends below the lower plug 122 though airtight insert 138. The extension 136 is pivotally connected at 137 to lever arm 140 which is pivotally attached to the pressure sensitive valve housing 100 at pivot 142. The lever arm is movable between the distance between the apex 128 and apex 124 of plugs 126 and 122.b 51179174.002

A first air impervious tube 144 has its first end 146 passing through an opening 148 into the pressure sensing chamber 112 and its second end 150 connected to a porous ceramic element 152.

A second air impervious tube 154 has its first end 156 passing through a second opening 158 into the pressure sensing chamber 112 and has its second end 160 connected to a low pressure area LP at the output 162 of a venturi device 164 connected to the output of the main valve 11 in the main water line input WI.

A high resistance ceramic device 166 is inserted in the second tube 154, as is a one-way check valve 168 consisting of a ball element 170 pressed by a spring 172 against seat 174. The high resistance device 166 is preferably ceramic and is only slightly pervious to air but may be of any configuration, construction, or material that permits only small amounts of air to slowly pass through the device, either by physical structure or by means of a valve configuration.

The pilot valve assembly 115 is normally spring-biased downward by spring 132 so that plug 126 blocks the flow of fluid through the passageway 42, preventing fluid from passing to the lower side of piston 18, thereby maintaining the main valve 11 in a closed position. However, when the diaphragm 104 is lifted, fluid is allowed to pass through the pilot port 42 to chamber 19 opening the main valve 11, and the fluid flows freely.

A quick shutoff control 200 is attached to the pressure sensitive valve housing 100. The quick shutoff control 200 consists of a grouping ring 201 attached to a generally conical-shaped plug 202, having a shaft 203 connected to the apex of the conical-shaped plug 202. The shaft 203 has an enlarged portion 204 at its other end. The shaft 203 and enlarged portion 204 fit within passageway 208 forming an air passageway into the pressure sensing chamber 112. A spring 230 surrounding shaft 203 abutting against a reduced portion 207 in the top of the passageway 208, and the enlarged portion 204 of shaft 203, and normally biases the plug 202 against the opening in the passageway 208.

It will be appreciated that so long as the fluid is prevented from passing to chamber 19, the main valve 11 remains closed. However, when the fluid is allowed into the chamber 19, the main valve 11 will remain open.

The ceramic element 152 is porous and has a pore size of about 12 microns or smaller, so that air can pass through the pores when moisture is not present, but when moisture is present, the pores are blocked and prevent the passage of air.

While a ceramic element is commonly used for these applications, other materials, such as plastic, having a similar pore size could also be used. Ceramic elements are disclosed in the U.S. Pat. No. 3,758,987 to Crane.

The ceramic element 166 has a pore size smaller than 12 microns, and preferably in the range of 6-8 microns. At this pore size, the flow of air through the pores is somewhat restricted but not completely blocked, creating a resistance in the second tube 154.

A description of the operation of the underlying system follows. For ease of understanding, the operation of the device will be first described generally without reference to the quick shut off control 200 and associated apparatus.

Making reference to FIGS. 2 and 3, the main valve 11 is connected at its input WI to a source of water under pressure such as an outdoor faucet. Its outlet WO is connected to the sprinkler system or other water distribution system. The ceramic sensing element 152, which is connected to the chamber 112 by the tube 144, is inserted in the ground in the location to be watered or at the desired water level of the pool.

The main valve 11 is initially in a closed condition so that water is not permitted to pass through the venturi device 164. Assuming that the handle 37 of the main valve 10 is turned so as to have main valve 11 in an open position, the operation is as follows.

Lever arm 140 is depressed to the horizontal position, unblocking passage 42 and water is allowed to flow through the system. The water flowing through the venturi device 164 creates a region of low pressure at LP. This low pressure region creates suction in the tube 154 and drawing at the air contained in the tube 154, as well as at the air in the pressure sensing chamber 112 and the air in the tube 144 connected to the ceramic element 152. Since the ceramic element 152 is dry, air is allowed to pass into the ceramic element 152, through the first tube 144, and into the pressure sensing chamber 112. Accordingly, when water is flowing through the venturi device 164 causing suction on the air in the pressure sensing chamber and the air is replenished through the ceramic element 152, the air pressure in the pressure sensing chamber 112 remains at small vacuum pressure and the diaphragm 104 remains at the intermediate position to which it was moved by the initial depressing of lever arm 140. Water continues to flow through the main valve 11, through the venturi device 164 to the main outlet WO and to the sprinkler system or pool watering tube.

When the ceramic element 152 is sufficiently wet from the sprinkling so that air can no longer flow through the ceramic element 152, the suction created by the venturi device 164 results in the creation of a low pressure area in the pressure sensing chamber 112 above the diaphragm. This causes the diaphragm 104 to move to the upper position from its intermediate position. The lower plug 122 then blocks the passageway 42 and water ceases to flow to chamber 19, closing the main valve 11.

Thus, a simple, reliable apparatus is disclosed which may be readily used in existing water sprinkling systems and which does not require maintenance, supervision, or electrical components.

The quick shut off control 200 apparatus is incorporated into the system for the dual purpose of serving as a quick shut off control and also as a safety device, in the event that there is a total opening of the tube 144, such as by accidental cutting by a lawn mower. In the absence of such control, if tube 144 were entirely severed, the lowered air pressure above the diaphragm 104 in the pressure sensing chamber 112 could not be created, even if the ceramic element 152 was wet. The main valve 11 would continue to operate in its open condition, as though the ceramic element 152 were dry. The control valve 200 senses a complete opening to atmospheric pressure and closes the system, shutting off the water as follows.

The quick shutoff control 200 is attached to the pressure sensitive valve housing 100. In order to manually shut off the valve, it is necessary only to pull up ring 201. By opening the air passageway 208 to chamber 112, the pressure in the pressure sensing chamber above the diaphragm will be reduced to atmospheric pressure. This will close the valve by causing spring 132 to push plug 126 downward to close passageway 42.

Under working conditions, the action of the spring 230 and vacuum pressure will maintain the shut off control 200 in a closed position.

It will be appreciated that so long as the fluid is prevented from passing to chamber 19, the main valve 11 remains closed. However, when the fluid is allowed into the chamber 19, the main valve 11 will remain open.

In reference to FIG. 3, the device is shown in its intermediate position. The beginning position is with the upper conical section 126 pressed down and the third position is with the lower conical section 122 pressed up. The spring 132 biases plug 126 downward so that the plug 126 blocks the top opening to passageway 42. Accordingly, no water can flow to the chamber 10 to open the main valve 11 when the device is in the beginning first position. So long as the plug 126 remains in this position, the main valve 11 will be closed and no water can flow. Upon slightly depressing the lever arm 140, the plug 126 no longer blocks the passageway 42 and water is permitted to pass through the passageway 42 to chamber 19 so as to open the main valve 11.

Water passing through the venturi device 164 creates suction on the check valve 168 and the tube 154. The suction created by the venturi device 164 is sufficiently strong to still draw sufficient air through the highly resistive element 166 so as to draw out the air in the pressure sensing chamber 112. If the ceramic element 152 is wet, then the suction created by the venturi device is great enough to create a low pressure area above the diaphragm 104 and cause the diaphragm to lift up, pulling the plunger pin 116 and the plug 122 up with it. This closes off the passageway 42, causing the main valve 11 to close. The check valve 168 prevents the air from entering the system and destroying the low pressure area.

If the ceramic element 152 is dry, air is permitted to enter the tube 144 and the pressure sensing chamber 112. There is not enough suction created by the venturi device 164 to cause the diaphragm 104 to stay up. The diaphragm 104 drops and opens passageway 42, allowing water to flow. This cycle is repeated as the ceramic element dries and then gets wet again.

If the pressure sensing chamber were to be open to the atmosphere, such as by a tube being cut, or ring 201 being lifted, the air pressure in the pressure sensing chamber 112 above the diaphragm would be so great that the suction created by the venturi device 164 would be insufficient to maintain the diaphragm 104 in its intermediate position. This is due to the limitation on the amount of air that can be drawn by the venturi device 164 as a result of the highly resistive element 166. The diaphragm 104 would be drawn down, by spring 132. The chamber 42 would be blocked by the upper plug 126 and water would cease to flow.

The size and effect of the resistive element 166 is such that the amount of air drawn from the pressure sensing chamber 112 is not great enough to overcome the spring tension of spring 132 so as to open the passageway 42 when blocked by the plug 126. The highly resistive element 166 is in the order of more than ten times impervious to air as that of the resistance to air of the ceramic element 152 when dry. Thus, when the pressure sensing chamber 112 is open to the atmosphere, the low pressure area in the chamber 112 is not sufficient to overcome the spring tension of spring 132. However, when the chamber 112 is able to receive air only through the tube 144 and the ceramic element 152, once the passageway 42 is opened, there is a sufficient low pressure created in the pressure sensing chamber 112 so as to overcome the spring tension of spring 132 in order to prevent the spring 132 from pulling the plunger pin 116 down again.

The water to the main valve 11 can be shut off by turning the handle 37, but for immediate shut off and for situations where the water supply is to be only temporarily shut off, the lever arm 140 can be lifted, blocking passageway 42 as in FIG. 3, or ring 201 can be lifted, to shut off the water as well.

Figure 4:
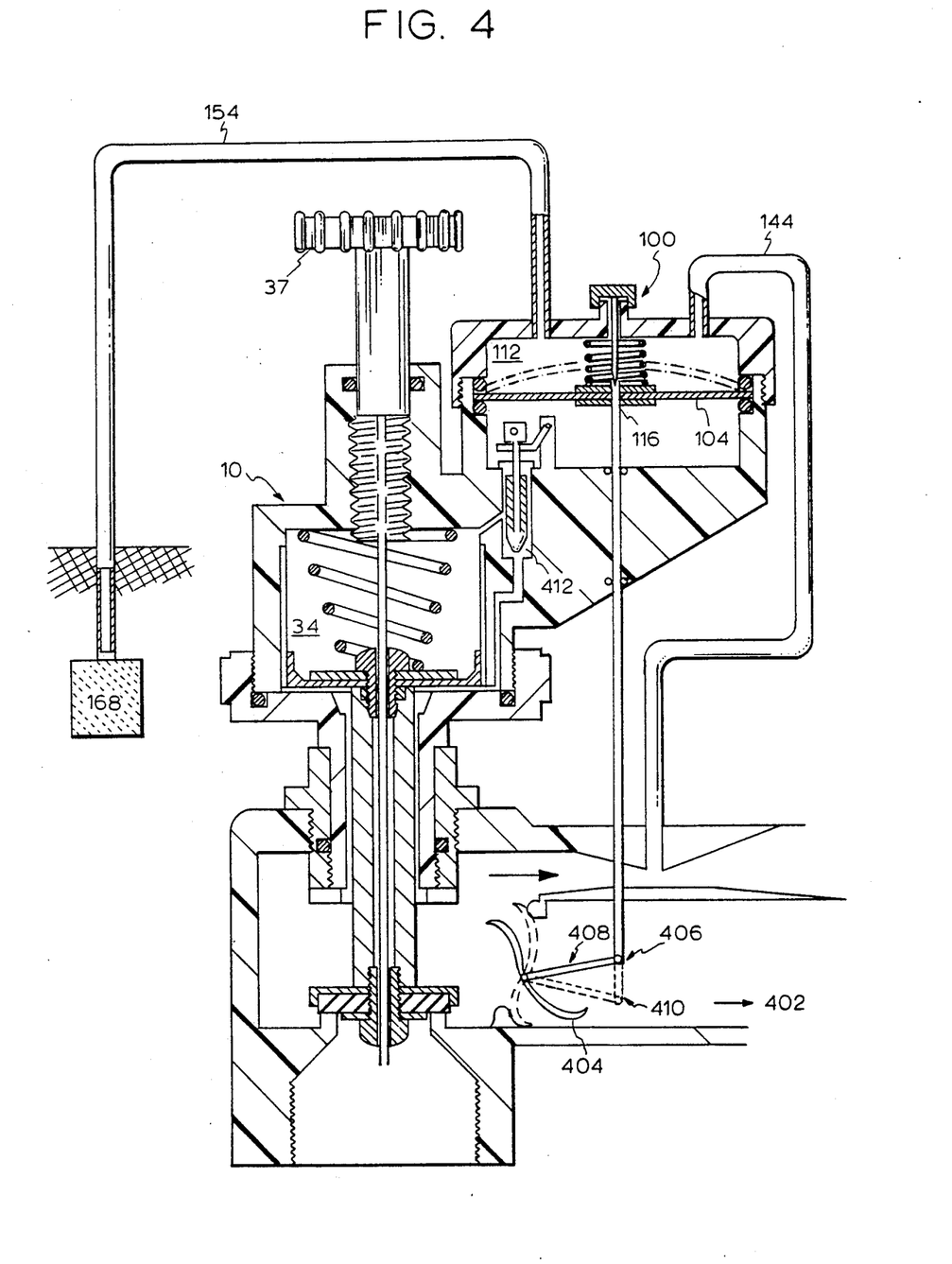
FIG. 4 is a section view of the present invention showing the butterfly valve and bypass assembly.

Having described the underlying invention. reference is now made to FIG. 4 which shows the bypass conduit 402, the butterfly valve 404, and the extended plunger pin 406.

Bypass conduit 402 sits below the venturi 164. Upstream of bypass conduit 402 is the butterfly valve 404. Butterfly valve 404 pivots at its center to allow access to the bypass conduit 402. Bypass conduit 402 is connected to devices downstream requiring the unimpeded flow of water.

Butterfly valve 404 has attached behind it an extension 408. Extension 408 is attached at one end to the butterfly valve 404, and is pivotally attached to the valve connecting rod 410 at its other end. Valve connecting rod 410 moves in a vertical manner to open and close the butterfly valve 404.

Valve connecting rod 410 is in communication with the pressure sensitive valve 100. This may be accomplished in a variety of ways, most particularly by means of a system of levers (not shown) that control the movement of valve connecting rod 410. The pressure sensitive valve 100 communicates to the lever system through its plunger pin 116 and necessary extensions thereof.

Briefly, when the valve's pressure chamber 112 is held at a sufficient vacuum, the diaphragm 104 raises up and pulls the plunger pin 116 with it. This is the off or no flow position. The butterfly valve 404 is then placed in a closed position so that water pressure may be exerted upon the venturi 164. The valve connecting rod 410 is then in a lowered position in order to place the butterfly valve 404 in a closed position.

When the vacuum or lowered pressure in the pressure chamber 112 is released, the diaphragm 104 lowers and water flows. The plunger pin 116 also lowers with the diaphragm 104. The plunger pin 116 pushes upon the lever system (not shown), which in turn raises the valve connecting rod 410 and opens the butterfly valve 404. Water flows through the open butterfly valve 404 and also through the venturi 164. Water flowing through the venturi 164 provides some vacuum pull so that when the ceramic sensor element 152 becomes saturated, the vacuum may be transmitted from the venturi 164 to the pressure chamber 112. Upon sufficiently lowered pressure, the diaphragm 104 raises and cuts off the water flow.

FIG. 4 shows an alternative embodiment of the automatic water control apparatus with a plug 412 just raising and lowering in response to the diaphragm 104 and plunger pin 116. For the preferred water control apparatus embodiment, the functioning of the butterfly valve assembly and related components is predominately, if not entirely, the same.

Figure 5:
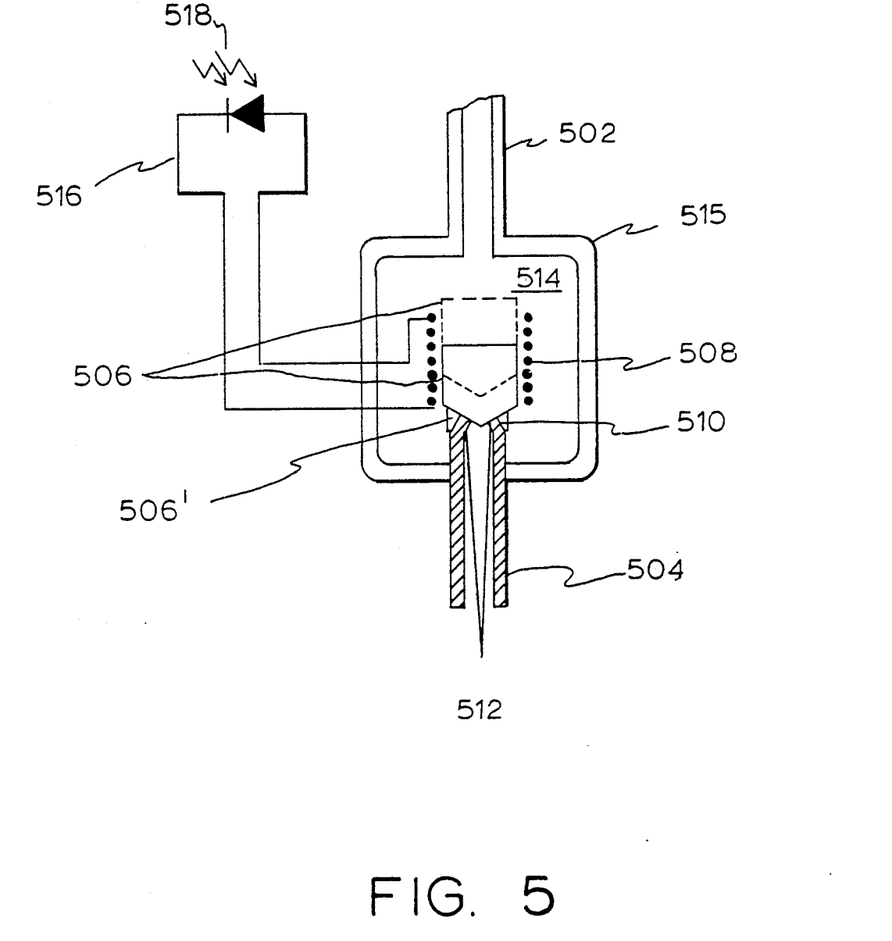
FIG. 5 is a section view of the present invention showing the solar cell, the solenoid, and the movable plug.

Referring to FIG. 5, a solar cell/solenoid assembly is shown that controls the flow of air through upper and lower tubes 502, 504. A movable plug 506 is enclosed by the solenoid 508. The movable plug 506 moves vertically, and finds a seat 510 over the opening 512 of the lower tube 504. When seated, the movable plug 506' prevents air flowing from the upper tube 502 through the chamber 514 and to the lower tube 504. The solenoid 508 and the movable plug 506 are encased in a housing 515. A restoring force (not shown), such as a spring, keeps the movable plug 506 in one positive position when the solenoid is not energized.

The solenoid is powered by a solar cell 516 that takes in light 518 to produce electrical energy. When the solenoid 508 is energized, the movable plug is impelled down and towards its seat 510 on the lower tube 504. When the movable plug 506 is lifted by the solenoid 508, incoming air from the upper tube 502 is allowed to travel through the chamber 514 and the lower tube 504.

When distribution of water is desired at night only, the solar cell/solenoid system provides means by which the vacuum pulled by the venturi 164 may be maintained during the day, while still allowing on demand watering at night. During the day, the movable plug 506 is held in place by the energized solenoid 508. At night, a spring or other restoring force returns the movable plug 506 to its open position so that the ceramic sensor element 152 may affect the pressure chamber 112 and on-demand watering may occur.

An alternative embodiment of the solar cell/solenoid system is realized when a restoring force is used to keep the movable plug seated while the energized solenoid 508 unseats the movable plug 506 during the day. When this configuration is used, the ceramic sensor element 152 operates effectively during the day, but at night is usurped by the movable plug 506 which maintains the vacuum of the venturi 164.

Figure 6:
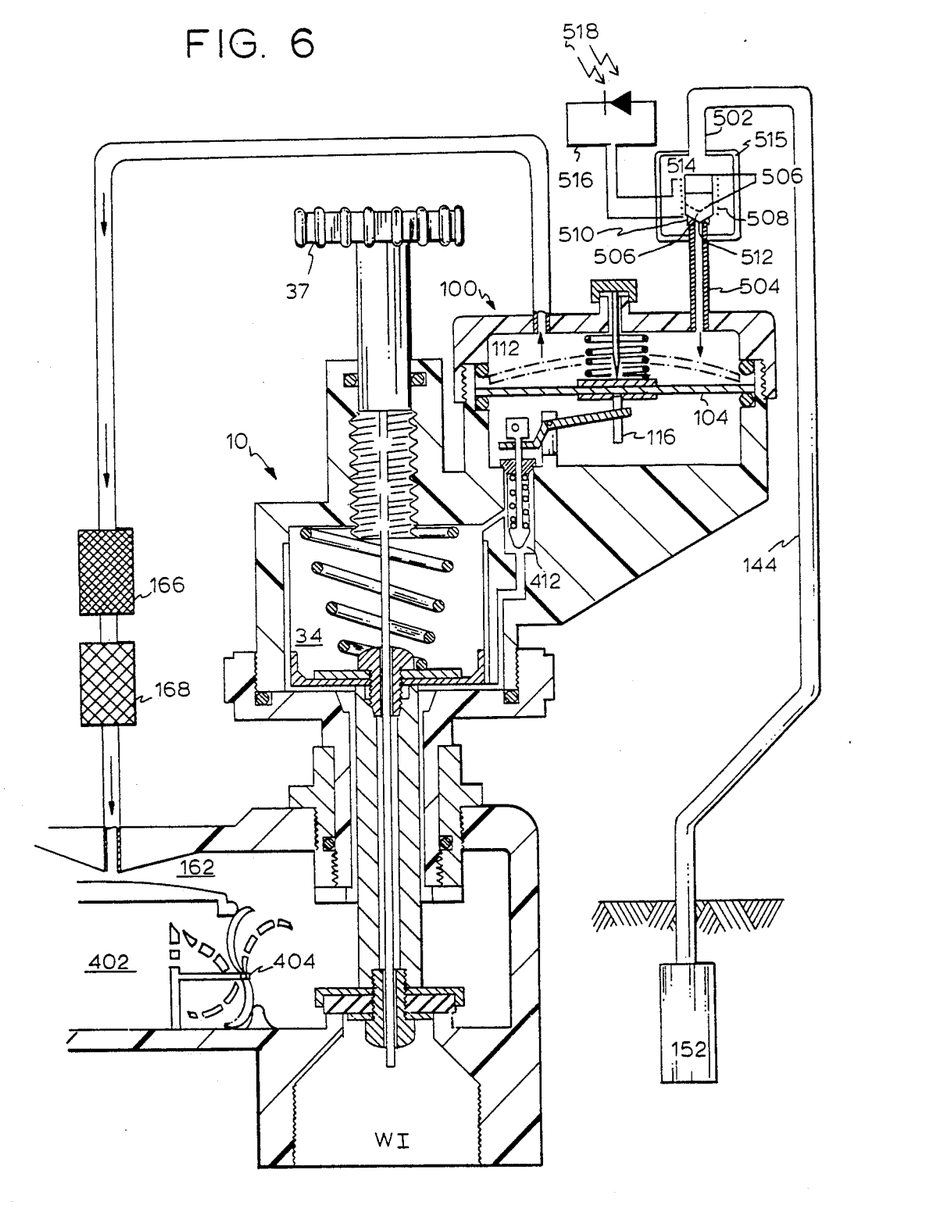
FIG. 6 shows a section view of the present invention showing both the butterfly valve/bypass assembly and the day/night control.

FIG. 6 shows the automatic water control apparatus with both the butterfly valve and the solar cell/solenoid.

While the present invention has been described with regards to particular embodiments, it is recognized that additional variations of the present invention may be devised without departing from the inventive concept.

What is claimed is:

1. An automatic control for controlling the flow of water through a system, including a main control valve means, a pressure sensitive valve means, a porous moisture sensing means, and a venturi means, further comprising:

a bypass means for allowing water to flow around said venturi means, said bypass means controlled by a butterfly valve, said butterfly valve controlled by said pressure sensitive valve means.

2. The automatic control for controlling the flow of water through a system of claim 1, wherein said butterfly valve is responsive to said venturi means.

3. An automatic control for controlling the flow of water through a system, including a main control valve means, a pressure sensitive valve means, a porous moisture sensing means, and a venturi means, further comprising:

a light-dependent, first hollow tubing control means whereby air flow through said first tubing means may be allowed or prevented, said first hollow tubing control means connected to said pressure sensitive valve means.

4. The automatic control for controlling the flow of water through a system of claim 3, wherein said light-dependent, first hollow tubing control means further comprises:

a solar cell means for supplying energy from light;
a solenoid means energized by said solar cell means;
a movable plug means encircled by said solenoid means, said movable plug preventing air flow through said first hollow tubing when said solenoid means is in one state of energization and allowing air flow through said first hollow tubing when said solenoid means is in another state of energization; and
a restoring force means for providing a restoring force upon said movable plug whereby when said solenoid means is not energized, said movable plug is urged to a specific rest position.

5. An automatic control for controlling the flow of water through a system comprising:

a main water control valve means having an open position and a closed position for controlling the flow of water through said main water control valve means, said main water control valve means having an input water connection and an output water connection;
a pressure sensitive valve means having a first normal position and a spring biased second position connected to said main water control valve means for opening and closing said main water control valve means depending on the position of said pressure sensitive valve means, said pressure sensitive valve means responsive to the flow of air through said pressure sensitive valve means;
a porous moisture sensing means which is porous to air when dry and impervious to air when wet, said porous moisture sensing means connected to said pressure sensitive valve means by a first hollow tubing, said porous moisture sensing means controlling the flow of air through said first hollow tubing into said pressure sensitive valve means;
a venturi means having a low pressure outlet portion, said venturi means responsive to the flow of water through said water output connection, said low pressure outlet portion of said venturi means connected by a second hollow tubing to said pressure sensitive valve means in order to control the position of said pressure sensitive valve means whereby when said porous moisture sensing means is impervious to air, the flow of water through said venturi device causes said pressure sensitive valve means to change from said first normal position to said spring biased second position and whereby said pressure sensitive valve means closes said main water valve means; and a light-dependent, first hollow tubing control means whereby air flow through said first tubing may be allowed or prevented.

6. The automatic control for controlling the flow of water through a system of claim 5, wherein said first hollow tubing control means further comprises:

a solar cell means for supplying energy from light;
a solenoid means energized by said solar cell means; and
a movable plug means encircled by said solenoid means, said movable plug preventing air flow through said first hollow tubing when said solenoid means is in one state of energization and allowing air flow through said first hollow tubing when said solenoid means is in another state of energization; and
a restoring force means for providing a restoring force upon said movable plug whereby when said solenoid means is not energized, said movable plug is urged to a specific rest position.

7. The automatic control for controlling the flow of water through a system of claim 6, wherein said one state of energization comprises an energized state.

8. The automatic control for controlling the flow of water through a system of claim 6, wherein said one state of energization comprises a de-energized state.

9. An automatic control for controlling the flow of water through a system comprising:

a main water control valve means having an open position and a closed position for controlling the flow of water through said main water control valve means, said main water control valve means having an input water connection and an output water connection;
a pressure sensitive valve means having a first normal position and a spring biased second position connected to said main water control valve means for opening and closing said main water control valve means depending on the position of said pressure sensitive valve means, said pressure sensitive valve means responsive to the flow of air through said pressure sensitive valve means;
a porous moisture sensing means which is porous to air when dry and impervious to air when wet, said porous moisture sensing means connected to said pressure sensitive valve means by a first hollow tubing, said porous moisture sensing means controlling the flow of air through said first hollow tubing into said pressure sensitive valve means;
a venturi means having a low pressure outlet portion, said venturi means responsive to the flow of water through said water output connection, said low pressure outlet portion of said venturi means connected by a second hollow tubing to said pressure sensitive valve means in order to control the position of said pressure sensitive valve means whereby when said porous moisture sensing means is impervious to air, the flow of water through said venturi device causes said pressure sensitive valve means to change from said first normal position to said spring biased second position and whereby said pressure sensitive valve means closes said main water valve means; and
a bypass means for allowing water to flow around said venturi means, said bypass means controlled by a butterfly valve, said butterfly valve controlled by said pressure sensitive valve means.

10. The automatic control for controlling the flow of water through a system of claim 1, wherein said bypass means further comprises:

a connecting rod means for opening and closing said butterfly valve, said connecting rod means in communication with said pressure sensitive valve means whereby when said pressure sensitive valve means opens said main valve means and water flows through said automatic control, said butterfly valve opens and when said pressure sensitive valve means closes said main valve means and water ceases to flow through said automatic control, said butterfly valve closes.

11. The automatic control for controlling the flow of water through a system of claim 1, wherein said automatic control further comprises:

a light-dependent, first hollow tubing control means whereby air flow through said first tubing may be allowed or prevented.

12. The automatic control for controlling the flow of water through a system of claim 11, wherein said first hollow tubing control means further comprises:

a solar cell means for supplying energy from light;
a solenoid means energized by said solar cell means;
a movable plug means encircled by said solenoid means, said movable plug preventing air flow through said first hollow tubing when said solenoid means is in one state of energization and allowing air flow through said first hollow tubing when said solenoid means is in another state of energization; and
a restoring force means for providing a restoring force upon said movable plug whereby when said solenoid means is not energized, said movable plug is urged to a rest position.

13. The automatic control for controlling the flow of water through a system of claim 12, wherein said one state of energization comprises an energized state.

14. The automatic control for controlling the flow of water through a system of claim 12, wherein said one state of energization comprises a de-energized state.

* * * * *